Jan. 24, 1967  B. H. SHORT ETAL  3,300,709
CURRENT AND VOLTAGE REGULATOR
Filed Nov. 14, 1955

INVENTORS
Brooks H. Short
BY George B. Shaw

John P. Marvin
THEIR ATTORNEY

United States Patent Office 3,300,709
Patented Jan. 24, 1967

3,300,709
CURRENT AND VOLTAGE REGULATOR
Brooks H. Short and George B. Shaw, Anderson, Ind., assignors to General Motors Corporation, Detroit, Mich., a corporation of Delaware
Filed Nov. 14, 1955, Ser. No. 546,503
13 Claims. (Cl. 322—25)

This invention relates to voltage and current regulation of a variable speed power source and more particularly it relates to a current and voltage regulating system for automotive vehicles which is powered by a dynamo-electric unit whose speed varies widely and is dependent upon vehicle operation.

At the present time, voltage and current regulators, utilized in automotive systems, are of the carbon pile or vibratory types which have mechanically moving parts and are spring biased and operated by solenoid coils. The vibratory types also have mechanical contacts which are frequently a source of failure and unfavorable operation in that they are subject to burning, pitting or being welded together. When any of these failures occur, the accurate initial setting of the regulator is changed.

It is an object, therefore, of the present invention to provide an electrical voltage and current regulating system without moving parts.

Another object of the present invention is to provide a voltage and current regulating system for a D.C. generator wherein a transistor controls the field of the generator to vary the current flow therethrough depending on the line current and voltage.

A further object of the present invention is to include a Zener type diode in a transistorized current and voltage regulating system for a motor vehicle D.C. generating system wherein the Zener diodes are used to control the current flow through a transistor network which is connected with the field of the generator to vary the flow of current therethrough in response to the current and voltage output of the generator.

Further objects and advantages of the present invention will be apparent from the following description, reference being had to the accompanying drawings wherein preferred embodiments of the present invention are clearly shown.

Figure 1:
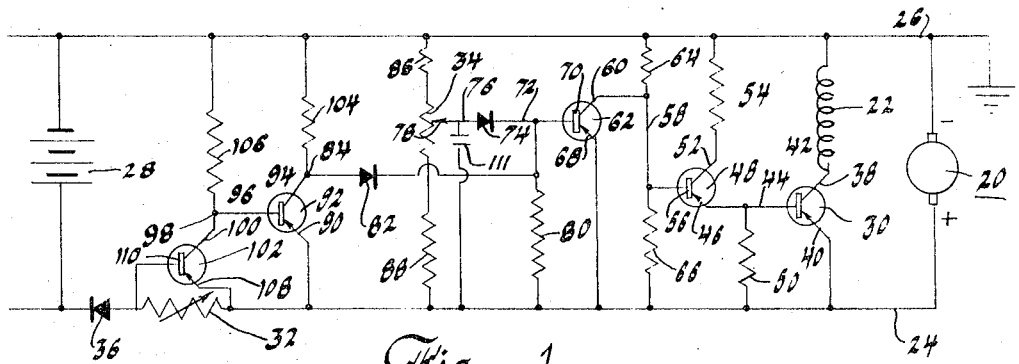
FIGURE 1 is a circuit diagram of a current and voltage responsive regulating system embodying the present invention.

In the drawings, and in FIGURE 1 particularly, there is shown a D.C. generator 20, such as used in an automobile, and whose speed varies widely during normal operation. The circuit shown will control the energization of the generator field 22 in response to both the voltage and current of the positive lead 24 and the negative lead 26 which are connected to the battery 28 and other electrical loads, not shown. To accomplish this control, the transistor 30 is made conductive to pass current to the field 22 whenever the current in and the voltage between leads 24 and 26 is less than a predetermined value as determined by the settings of resistances 32 and 34.

The circuits shown in the drawings represent an improvement in certain of the circuits as set forth in U.S. patent application, S.N. 468,731, filed November 15, 1954, now Patent No. 2,862,175, in the names of the inventors, James H. Guyton and Edward G. Roka, who have assigned the above application to the assignee of the present invention. The above referred to improvement being basically directed to a means for regulating the generator in response to fluctuations in current as well as voltage as was disclosed in the application supra.

In FIGURE 1 of the drawings, it will be seen that the variable resistance 32 and a power diode 36 are connected in series with the load, not shown, and battery 28. This power diode 36 serves as or can be replaced by a conventional cutout relay and is connected so the generator can supply power through it to the battery 28 and load with negligible voltage drop. It is included instead of a cutout relay to provide a static regulator without moving parts and will, under conditions of no generator output voltage, prevent the battery 28 from supplying power to the generator 20.

The field winding 22 of generator 20 has one end connected directly to lead 26 and the opposite end connected to the collector electrode 38 of the transistor 30. The emitter electrode 40 of transistor 30 is connected to lead 24. The base 42 of the transistor 30 is connected directly through a lead 44 to the emitter electrode 46 of a transistor 48. A resistance 50 is connected between leads 44 and 24. The collector electrode 52 of transistor 48 is connected through a resistance 54 with lead 26 and the base 56 of transistor 48 is connected through a lead 58 with a collector electrode 60 of a transistor 62. The lead 58 has one end connected through a resistance 64 to lead 26 and the other end connected through a resistance 66 with lead 24. The emitter electrode 68 of transistor 62 is connected directly to lead 24 and the base 70 is connected through a lead 72, a rectifying diode 74, and a lead 76 to a variable tap 78 on the variable resistance 34. A resistance 80 is connected between the lead 72 and lead 24 and a second rectifying diode 82 is connected between a junction 84 and lead 72. The variable resistance 34 has one end connected through a resistance 86 with lead 26 and the other end connected through a resistance 88 with lead 24. The emitter electrode 90 of the transistor 92 is connected to lead 24 and the collector electrode 94 of transistor 92 is connected with junction 84. The base 96 of the transistor 92 is connected through a junction 98 with the collector electrode 100 of a transistor 102. The resistances 104 and 106 each have one end respectively connected with junctions 84 and 98 and the other ends connected with lead 26. The transistor 102 has its emitter electrode 108 connected to the generator 20 side of variable resistance 32 and the base 110 connected to the battery 28 side of variable resistance 32. The condenser 111 is connected between leads 76 and 24 and is included in the circuit to remove commutator ripple of generator 20 and other transients. Were this condenser not used, the regulator, according to the present invention, would respond to the effective values of generator 20 output waves rather than the average or D.C. value.

The electrical capacities of the various components used in the above system will now be set forth. It is to be appreciated that these values are illustrative only and may be changed without departing from the scope of the present invention.

Generator output _____volts__ 12
Field resistance _____ohms__ 3
Resistance 50 _____do____ 1.5
Resistance 54 _____do____ 10
Resistance 64 _____do____ 470
Resistance 66 _____do____ 150
Resistance 80 _____do____ 100
Resistance 86 _____do____ 5
Resistance 88 _____do____ 33
Resistance 104 _____do____ 500
Resistance 106 _____do____ 500
Resistance 32 _____approx. ohms__ .0035

| | | |
|---|---|---|
| Resistance 34 | ohms | 25 |
| Condenser 112 | mfd | 100 |
| Zener diodes 74 and 82 | | IN-200 |
| Transistors 30, 48, 62, 92, 102 | | |

The diode rectifiers 74 and 82 are connected to normally prevent current flow through the resistor and are of the type known as Zener diodes which break down upon the application of a higher voltage than that for which it is designed so the current may flow through it in a reverse direction. However, upon restoring the normal voltage, or less, it recovers its rectifying or blocking action without damage.

In operation, the current and voltage regulating system will function as follows to control the flow of current through the field 22 of generator 20. When the generator 20 is producing both D.C. current and voltage sufficient to cause current to pass through diode 36 to battery 28, current will also pass through resistance 32. When the current flows through resistance 32, the base of the transistor 102 will become negative with respect to the emitter and cause the current through resistance 106 to be shifted from the base circuit of transistor 92 to the collector circuit of transistor 102. As this shift occurs, the base current in transistor 92 is reduced. Since the collector current in a transistor is a function of the base current and as the base current in transistor 92 is decreased, it therefore follows that the collector current in transistor 92 will be decreased and the current from collector of transistor 92 through resistance 104 is decreased. This means that as the current in the resistance 32 is increased, the current in resistance 104 is decreased. Such a decrease in current in resistance 104 results in a lower voltage drop in the resistance 104 thereby moving the potential of junction 84 closer to the negative side with an increase in current in resistance 32.

When the potential between lead 24 and junction 84 exceeds the Zener curve value of the diode 82, the diode 82 will permit current to pass through the resistance 80 to cause the base 70 of transistor 62 to become conductive. When the transistor 62 is conductive, it will control the action of transistors 30 and 48, as will be hereinafter described, to vary the current flow through field 22 to regulate the output of generator 20 in response to the current flowing through the variable resistance 32.

The control of the base current of transistor 62 is determined by the flow of current through the Zener diodes 82 or 74. When these diodes 82 or 74 are nonconductive, no current will pass through the base circuit of transistor 62. The Zener diode 82 will be rendered conductive in response to current flow through resistance 32 as heretofore set forth. When the voltage output of generator 20 exceeds a predetermined value, as destermined by the setting of tap 78, the potential imposed across Zener diode 74 will exceed its Zener curve value and diode 74 will be conductive. The setting of tap 78 on resistance 34 will determine the conductivity of diode 74. The greater the value of the resistance 34, as is determined by the location of tap 78, that is added to resistance 88, then the greater is the percentage of the voltage between leads 24 and 26 that will be imposed across diode 74, so when a predetermined voltage is impressed across diode 74, a lower output voltage of generator 20 will occur.

The transistor 48 is included in the circuit to increase the overall gain without accompanying phase reversal. As is evident in the circuit hook-ups of the transistors heretofore discussed, an increase of current in one stage results in a reversal or decrease in current in the next transistor. In order to obtain a sufficient amplification in the voltage device, a three-stage transistor amplifier is desirable. By using the circuit shown, the transistors 30 and 48 work in the same direction and do not reverse the phase. When the Zener diode 74 or 82 is made conductive, the base circuit of transistor 62 will be made conductive and the collector circuit of transistor 62 will pass current through resistance 64. This will cause the base current in transistor 48 to decrease. The current in the collector of transistor 48 is equal to alpha times the change in the base current. Thus, the current flowing through the emitter of transistor 48 is equal to (alpha plus 1) times the change in the base current of transistor 48 which will flow through either resistance 50 or through the base and emitter of transistor 30. The base to emitter resistance of transistor 30 is relatively small compared to the resistance value of resistance 50. For that reason, the change in current of (alpha plus 1) times the base current of transistor 48 is available to use as base current in transistor 30. As the base current in transistor 30 is decreased by this amount, the field 22 current, which is the collector current of transistor 30, is greatly reduced.

Figure 2:
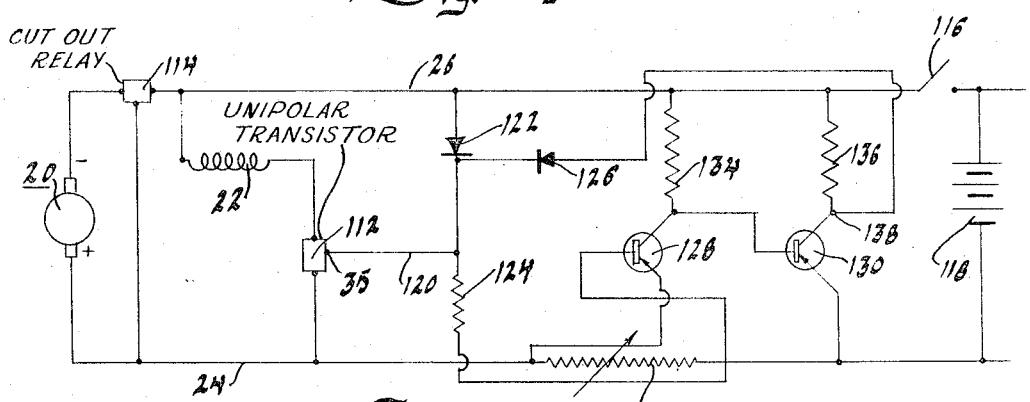
FIGURE 2 is a circuit diagram of a modified form of the invention in FIGURE 1.

In FIGURE 2 unipolar transistor 112 is used to control the output of generator 20 in response to voltage between leads 24 and 26. In this embodiment the generator 20 supplies power to leads 24 and 26 through a cutout relay 114 to a load circuit which includes a battery 118 when a switch 116 is closed. A unipolar transistor is similar to an electron tube in that the current flow through the crystal is controlled by voltage applied at the junction gate. The field 22 is connected to line 26 and to one ohmic contact of transistor 112. The other ohmic contact of transistor 112 is connected to line 24. The control junction 35 of transistor 112 is connected by a line 120 to a point intermediate a Zener diode 122 and a resistor 124 the opposite terminals of which are connected with leads 26 and 24 respectively. A second Zener diode 126 is connected to a point intermediate the Zener diode 122 and resistance 124.

Figure 3:
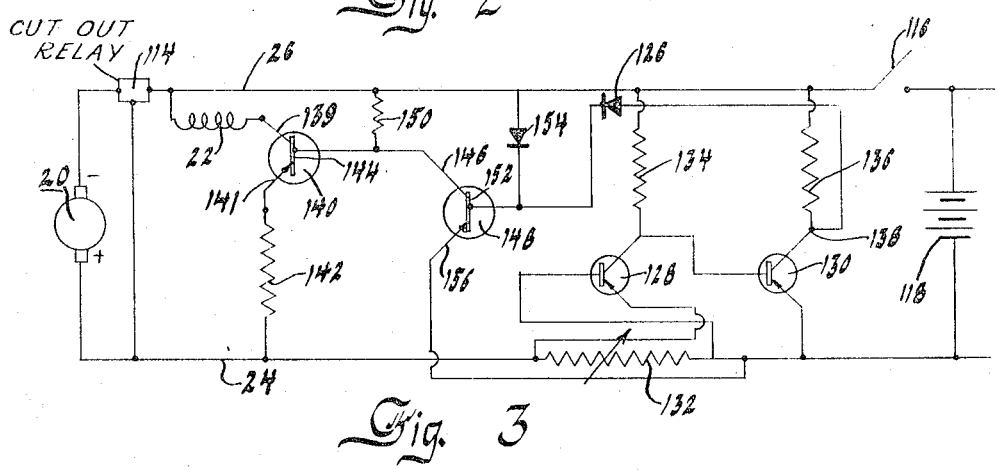
FIGURE 3 is a circuit diagram of another modification of the present invention.

In FIGURES 2 and 3, the transistors 128 and 130, variable resistance 132, fixed resistances 134 and 136, and junction 138 are circuited and have an operation respectively similar to the transistors 102 and 92, variable resistance 32, fixed resistances 106 and 104 and junction 84 as was described in FIGURE 1 so that as the current in resistance 132 is increased, the current in resistance 136 is decreased. Such a decrease in current in resistance 136 results in a lower voltage drop in resistance 136 to move the potential of junction 138 closer to the negative side with an increase in current in resistance 132.

When the potential between lead 24 and junction 138 exceeds the Zener curve value of diode 126, the diode will permit current to pass through the resistance 124 and increase the negative potential at the top of resistance 124 with respect to lead 24. Thus, the potential of contact 35 of transistor 112 will be responsive to the flow of current in resistance 132 as well as voltage as will be hereinafter set forth.

When switch 116 is closed, the field winding 22 is placed across leads 24 and 26 in series with transistor 112. The unipolar transistor 112 performs much like a triode vacuum tube in that the current flow through the transistor is controlled by the voltage on control contact 35. At the start of generator operation, the voltage of contact 35 is low with respect to line 24 so a large current flows through the transistor 112 and field 22 and the generator 20 builds up its output to close the output relay 114 and apply its output to leads 24 and 26. If the voltage between leads 24 and 26 tends to increase above a certain value, say 7 volts in a 6 volt system, the Zener diode 122 will break down to conduct current in the opposite direction. This conduction on the part of diode 112 causes the negative potential at the top of resistance 124 with respect to lead 24 to increase with a corresponding increase in potential at control contact 34. This, in turn, will reduce the conductivity of transistor 112 and the current flow through field 22 to reduce the generator 20 output voltage and current. Upon reduction of current and voltage below a predetermined value, the Zener diodes 122 and 126 will recover and cease passing current in the reverse direction and the control contact 35 voltage will decrease to provide the desired voltage regulation.

The control system illustrated in FIGURE 3 may be termed a two-stage control system as two transistor stages are used to control the field in response to current and voltage, the second providing amplification. This system also utilizes a current responsive network to control a Zener diode described in relation to FIGURE 2. In FIGURE 3 the field 22 is connected between line 26 and the collector electrode 139 of a junction transistor 140. The emitter electrode 141 of the transistor 140 is connected through a low resistance 142 to line 24. The base 144 of the transistor 140 is directly connected to the collector electrode 146 of a transistor 148. A resistor 150 is connected between line 26 and collector electrode 146. The base 152 of the transistor 148 is connected through a Zener diode 154 to line 26. The emitter electrode 156 of the transistor 148 is directly connected to lead 24 between the battery 118 and resistance 132.

The control of the Zener diode 126 in response to current in resistance 132 has been set forth in the description of the circuit in FIGURE 2. This diode 126 will become conductive whenever the potential at junction 138 moves a predetermined amount toward negative relative to lead 24.

In FIGURE 3, when ignition switch 116 is closed and the generator started, the current through the field coil 22, as controlled by transistor 140, will be relatively large, and the generator output will build up rapidly. At this time there is very little flow of current through transistor 148 so the current flow through base 144 and resistance 150 is high to provide a relatively large current flow in the field 22. When the generator voltage or current is applied to the lines 24 and 26 and increases above the desired level and above the reverse current breakdown point of the diode 154 or diode 126, the breakdown current through either of these diodes flows through the base of transistor 148. This allows a current to flow through resistor 150 from collector 146 and emitter 156. The current flow through resistance 150 will reduce the current flow from the base 144 to resistance 150. This reduction of current in base 144 results in a reduced collector to emitter current in transistor 140. Since the generator field is in this circuit, less field current flows and a reduction in generated voltage results. As soon as the voltage on lines 24 and 26 is reduced below a desired point, the Zener diodes 154 and/or 126 will cease to conduct in the reverse direction and the current flow in the base 144 will again change to provide the desired regulation.

While the embodiments of the present invention are disclosed herein in preferred forms, it is to be understood that other forms might be adopted.

What is claimed is as follows:

1. In an electrical supply system the combination comprising, a variable D.C. current and voltage source having a D.C. winding arranged to vary the output current and voltage of said source, a pair of leads connected to said source to provide a D.C. load circuit and a means in circuit with said winding and leads for varying current flow in said winding in response to variations in the voltage and current in said leads, said means including; a transistor, and a pair of diodes connected to said transistor, one of said diodes being connected to be responsive to voltage between said leads and the other connected to be responsive to current flow through said leads.

2. In an electrical supply system, the combination comprising; a variable D.C. current and voltage source having a D.C. winding arranged to vary the output current and voltage of said source, a pair of leads connecting with a D.C. load circuit to said source and a means connected to said leads and said D.C. winding for varying the current flow in said winding in response to the current and voltage of said leads, said means comprising; a transistor connected in circuit with said leads and field, and a pair of Zener type diodes connected to said transistor, one of said diodes being responsive to voltage between said leads and the other being responsive to current flow in said leads.

3. In an electrical system, the combination comprising; a direct current generator having an output circuit and an energizable field, leads connectible to said output circuit, a transistor having a base, emitter and collector electrodes, said emitter and collector being connected in series with said field across said leads, and means connected with said base and said leads to vary current flow through said base in response to current flow in and voltage across said leads.

4. In an electrical system, the combination comprising; a direct current generator having an output circuit and an energizable field, leads connectible to said output circuit, a transistor having a base, emitter and collector electrodes, said emitter and collector being connected in series with said field across said leads, and means including a pair of Zener diodes connected with said base and said leads to vary current flow through said base in response to current flow in and voltage across said leads.

5. In an electrical system, the combination comprising; a generator having output terminals and an energizable field, D.C. leads connected to said terminals, a transistor having a base, an emitter and a collector, said emitter and collector being connected in series with said field across said leads, a means connected with said base and leads for varying current flow through said base in response to the voltage across said leads, and a means connected with said base and responsive to current flow in said leads for varying current flow in said base, said last means comprising; a Zener diode, a resistance and a transistor having a base and emitter connected in shunt with said resistance and a collector connected to said diode and in circuit with said first named transistor for varying the potential across the said diode in response to current in said resistance.

6. In an electrical system, the combination comprising; a generator having output terimnals and an energizable field, a D.C. load circuit connected in circuit with said output terminals, a resistance in said load circuit, a first transistor in parallel circuit with said resistance and load circuit, a second transistor in circuit with said first transistor and load circuit, a third transistor in circuit with said second transistor and load circuit, a Zener type diode in the circuit between said second and third transistors and a pair of transistors connected in circuit with each other, one of said transistors being in circuit with said generator field and the other in circuit with said third transistor, said pair of transistors being circuited for amplifying current flow change in said third transistor in the field of said generators.

7. In an electrical supply system, a direct current generator having an output terminal and a field winding, a pair of D.C. load leads connected in circuit with said output terminals, a unipolar transistor connected in series with said field across said leads and having a control junction, a rectifier and resistance connected in series across said leads, said rectifier being connected to oppose current flow from the higher voltage lead to the lower and having a breakdown voltage less than certain voltages applied to said leads by the generator, means connecting the control junction of the transistor to a point intermediate the rectifier and resistance to control the flow through the transistor in response to the voltage between said leads, and means including a resistance, a pair of transistors and a rectifier connected to said control junction and said leads for controlling the flow of current through said transistor in response to current flow in said leads.

8. In an electrical supply system, the combination comprising; a generator having output terminals and an energizing field, a D.C. load circuit including a source of constant D.C. current and voltage connectible through means including a pair of leads with said output terminals, a transistor having a base, emitter and collector electrodes, said emitter and collector being connected in series circuit with said field across said leads, a second transistor having, a base, collector and emitter with the collector thereof connected to the base of said first transistor, a rectifier in series circuit with the emitter and base of said second transistor across said leads, said rectifier connected in such relation to prevent flow of current through said second transistor between said leads until voltage between said leads exceeds a predetermined value and a means responsive to current flow in said leads connected to the base of the second transistor.

9. In an electrical supply system, the combination comprising; a generator having output terminals and an energizing field, a D.C. load circuit including a source of constant D.C. current and voltage connectible through means including a pair of leads with said output terminals, a transistor having a base, emitter and collector electrodes, said emitter and collector being connected in series circuit with said field across said leads, a second transistor having, a base, collector and emitter with the collector thereof connected to the base of said first transistor, a rectifier in series circuit with the emitter and base of said second transistor across said leads, said rectifier connected in such relation to prevent flow of current through said second transistor between said leads until voltage between said leads exceeds a predetermined value and a means responsive to current flow in said leads connected to the base of the second transistor, said current responsive means including; a resistance in one of said leads in series with said load circuit, a third transistor having its base and emitter in shunt circuit with said resistance and its emitter and collector in shunt with said lead, a resistance in series with the collector emitter shunt circuit, a fourth transistor having its emitter and collector circuit connected in series with a resistance across said leads and its base and emitter connected between the collector and resistance of said third transistor, and a rectifier connected between the collector of said fourth transistor and the base of said second transistor, said rectifier being connected in said circuit to prevent flow of current through the resistance in the circuit including the collector of said fourth transistor whenever the current flow through the resistance in said load circuit is less than a predetermined value.

10. In an electrical system, the combination comprising; a generator having a field winding, a direct current output circuit having a pair of output leads connected to be energized by said generator, a transistor having base, emitter and collector electrodes, said emitter and collector being connected in series with said field winding and across said leads whereby the current passing through said field is controlled as a function of conductance of said transistor, voltage sensing means for sensing the voltage appearing across said leads, current sensing means for sensing the current flowing through said leads, a base circuit for said transistor connected between the base electrode of said transistor and one of said leads, and means connected in said base circuit having a variable conductance connected with said voltage and current sensing means to respond to changes in voltage and current sensed by said sensing means.

11. In an electrical system, the combination comprising; a generator having a field winding, a direct current output circuit having a pair of output leads connected to be energized by said generator, a transistor having base, emitter and collector electrodes, said emitter and collector being connected in series with said field winding and across said leads whereby the current passing through said field is controlled as a function of conductance of said transistor, a base circuit for said transistor connected between the base electrode of said transistor and one of said leads and including a circuit element having a variable conduction, and means for varying the conduction of said circuit element in response to the voltage appearing across said leads and in response to current passing through said leads.

12. In an electrical system, the combination comprising; a generator having a field winding, a direct current output circuit having a pair of output leads connected to be energized by said generator, a transistor having base, emitter and collector electrodes, said emitter and collector being connected in series with said field winding and across said leads whereby the current passing through said field is controlled as a function of conductance of said transistor, a base circuit for said transistor connected between the base electrode of said transistor and one of said leads, and means for varying the conductance of said base circuit in response to the voltage appearing across said leads and in response to the current passing through said leads.

13. In an electrical system, the combination comprising, a direct current generator having an output circuit and an energizable field, leads connected to said output circuit, and transistor means connected in circuit with said field and in circuit with said leads to control current flow through said field in response to current flow in and voltage across said leads.

References Cited by the Examiner
UNITED STATES PATENTS

| | | | |
|---|---|---|---|
| 1,434,869 | 11/1922 | Wold et al. | 322—73 |
| 2,057,490 | 10/1936 | Jenks | 322—25 |
| 2,118,644 | 5/1938 | Garman | 322—23 |
| 2,616,072 | 10/1952 | Edwards et al. | 322—73 |
| 2,740,086 | 3/1956 | Evans et al. | 322—28 |

JOHN F. COUCH, *Primary Examiner.*

RALPH, R. YOUNG, ORIS L. RADER, *Examiners.*

T. M. PHILLIPS, G. PARKER, R. J. CRAWFORD, R. C. SIMS, S. WEINBERG, *Assistant Examiners.*